(12) United States Patent
Glinert et al.

(10) Patent No.: US 9,827,741 B2
(45) Date of Patent: Nov. 28, 2017

(54) DISPLAY DEVICE

(71) Applicant: Multi Packaging Solutions, Inc., Lansing, MI (US)

(72) Inventors: Kenneth Glinert, Chappaqua, NY (US); Philip Miller, Greenfield, IN (US)

(73) Assignee: MULTI PACKAGING SOLUTIONS, INC., Lansing, MI (US)

( * ) Notice: Subject to any disclaimer, the term of this patent is extended or adjusted under 35 U.S.C. 154(b) by 196 days.

(21) Appl. No.: 14/711,009

(22) Filed: May 13, 2015

(65) Prior Publication Data

US 2015/0328862 A1 Nov. 19, 2015

Related U.S. Application Data

(60) Provisional application No. 61/993,710, filed on May 15, 2014.

(51) Int. Cl.
*B32B 3/24* (2006.01)
*B32B 7/04* (2006.01)
(Continued)

(52) U.S. Cl.
CPC .............. *B32B 7/12* (2013.01); *B32B 3/266* (2013.01); *B32B 27/10* (2013.01); *B32B 27/36* (2013.01); *B32B 29/08* (2013.01); *B42D 15/045* (2013.01); *B65D 73/0085* (2013.01); *B32B 29/005* (2013.01); *B32B 2250/04* (2013.01); *B32B 2272/00* (2013.01); *B32B 2307/412* (2013.01); *B32B 2307/702* (2013.01); *B32B 2425/00* (2013.01); *B32B 2439/00* (2013.01); *B32B 2553/00* (2013.01); *B42D 15/04* (2013.01); *B42D 15/042* (2013.01);
(Continued)

(58) Field of Classification Search
CPC .................................................. B65D 73/0078
See application file for complete search history.

(56) References Cited

U.S. PATENT DOCUMENTS

| 359,955 A | * | 3/1887 | Bellis | B65D 27/00 |
|---|---|---|---|---|
|  |  |  |  | 229/92.9 |
| 456,717 A | * | 7/1891 | Brodix | B42D 15/042 |
|  |  |  |  | 283/117 |

(Continued)

FOREIGN PATENT DOCUMENTS

| CA | 2627782 A1 | 9/2008 |
|---|---|---|
| DE | 19653891 C1 | 6/1998 |

(Continued)

OTHER PUBLICATIONS

Petro Polymer Shargh et al., PET film, Jan. 2014.*
Ferguson, 10 Easy tips on displaying your greeting cards, Nov. 2009.*

*Primary Examiner* — Jeff Vonch
(74) *Attorney, Agent, or Firm* — The Dobrusin Law Firm, P.C.

(57) ABSTRACT

A display device comprising a first receiving layer and a second receiving layer located onto and in direct planar contact with the first receiving layer; a first support later and a second support layer located onto and in direct planar contact with the first support layer; and a sleeve for receiving the first and second receiving layers and first and second support layers.

11 Claims, 1 Drawing Sheet

(51) Int. Cl.
    *B32B 7/14*         (2006.01)
    *B32B 29/00*       (2006.01)
    *B32B 29/08*       (2006.01)
    *B65D 73/00*       (2006.01)
    *B65D 85/00*       (2006.01)
    *G09F 1/04*         (2006.01)
    *G09F 1/10*         (2006.01)
    *B42D 15/04*       (2006.01)
    *B32B 7/12*         (2006.01)
    *B32B 3/26*         (2006.01)
    *B32B 27/10*       (2006.01)
    *B32B 27/36*       (2006.01)
    *G09F 3/02*         (2006.01)
    *B65D 75/54*       (2006.01)
    *B42D 25/20*       (2014.01)
    *B65D 59/00*       (2006.01)

(52) U.S. Cl.
    CPC ............ *B42D 25/285* (2014.10); *B65D 59/00* (2013.01); *B65D 73/0078* (2013.01); *B65D 73/0092* (2013.01); *B65D 75/54* (2013.01); *B65D 85/00* (2013.01); *G09F 1/04* (2013.01); *G09F 1/10* (2013.01); *G09F 2003/0279* (2013.01); *Y02W 30/801* (2015.05); *Y02W 30/805* (2015.05); *Y10T 428/22* (2015.01); *Y10T 428/239* (2015.01); *Y10T 428/24025* (2015.01); *Y10T 428/24182* (2015.01); *Y10T 428/24264* (2015.01); *Y10T 428/24298* (2015.01); *Y10T 428/24331* (2015.01); *Y10T 428/31786* (2015.04)

(56) References Cited

U.S. PATENT DOCUMENTS

| | | | | |
|---|---|---|---|---|
| 2,014,743 A * | 9/1935 | Charles | ................... | G03B 21/64 40/705 |
| 2,077,570 A * | 4/1937 | Lamare | ................... | B65D 5/00 206/557 |
| 2,360,916 A * | 10/1944 | Von Trott | ............... | B42D 15/04 446/147 |
| 2,394,980 A * | 2/1946 | Byck | ................... | B42D 15/02 283/116 |
| 2,470,370 A * | 5/1949 | Ritter | ................... | A47F 7/022 206/486 |
| 2,875,672 A * | 3/1959 | Cross | ................... | G09F 23/00 40/774 |
| 2,948,199 A * | 8/1960 | Cross | ................... | B65D 73/0035 493/344 |
| 3,078,107 A * | 2/1963 | Loderhose | ............... | B42D 3/12 281/29 |
| 3,567,103 A * | 3/1971 | Seifert | ................... | B65D 5/5054 206/562 |
| 3,595,383 A * | 7/1971 | Boylan | ................... | B65D 73/0085 206/312 |
| 3,927,767 A * | 12/1975 | Sato | ................... | B65D 81/022 206/214 |
| 4,019,943 A * | 4/1977 | Holson | ................... | B42F 5/00 156/227 |
| 4,200,222 A * | 4/1980 | Feuer | ................... | B42D 15/045 206/813 |
| 4,359,633 A | 11/1982 | Bianco | | |
| 4,632,428 A * | 12/1986 | Brown | ................... | B42D 15/0033 283/112 |
| 4,840,275 A * | 6/1989 | Faiola | ................... | B42D 15/045 206/423 |
| 4,887,763 A | 12/1989 | Sano | | |
| 5,074,593 A * | 12/1991 | Grosso | ................... | G09F 1/10 283/109 |
| 5,120,090 A * | 6/1992 | Reinl | ................... | B42D 15/045 283/117 |
| 5,249,670 A * | 10/1993 | Simon | ................... | B65D 5/4204 206/474 |
| 5,269,084 A * | 12/1993 | Best | ................... | A47G 1/0633 40/124.11 |
| 5,284,365 A * | 2/1994 | Stuart | ................... | B42D 15/045 283/117 |
| 5,287,641 A * | 2/1994 | Showers | ................... | G09F 1/12 40/124.09 |
| 5,303,487 A * | 4/1994 | Olson | ................... | G09F 1/06 40/124.12 |
| 5,418,020 A * | 5/1995 | Crane | ................... | B42D 15/042 428/12 |
| 5,518,488 A * | 5/1996 | Schluger | ............... | B65D 85/546 493/356 |
| 5,667,247 A | 9/1997 | Ramsburg et al. | | |
| 5,720,381 A * | 2/1998 | Betancourt | .......... | A45C 11/326 206/8 |
| 5,749,463 A * | 5/1998 | Collins | ............... | G11B 33/0422 206/308.1 |
| 5,760,381 A | 6/1998 | Stich et al. | | |
| 5,769,216 A * | 6/1998 | Collins | ............... | G11B 33/0422 206/308.1 |
| 5,772,018 A * | 6/1998 | Walch | ................... | G11B 33/0422 206/308.1 |
| 5,772,019 A * | 6/1998 | Reed | ................... | B65D 85/544 206/308.1 |
| 5,777,305 A | 7/1998 | Smith et al. | | |
| 5,842,629 A | 12/1998 | Sprague et al. | | |
| 5,868,498 A | 2/1999 | Martin | | |
| 5,975,302 A | 11/1999 | Young | | |
| 5,988,685 A * | 11/1999 | Mogelonsky | ............. | B42F 7/02 229/71 |
| 6,003,254 A * | 12/1999 | Lorber | ................... | B42D 15/045 206/312 |
| 6,006,911 A * | 12/1999 | Levy | ................... | B65D 73/0085 206/456 |
| 6,092,653 A * | 7/2000 | Pozzoli | ................... | B65D 85/546 206/312 |
| 6,096,387 A | 8/2000 | Decker | | |
| 6,099,928 A * | 8/2000 | Chee | ................... | A47G 1/141 40/768 |
| 6,109,439 A | 8/2000 | Goade | | |
| 6,128,840 A * | 10/2000 | Boisvert | ................... | G09F 5/04 206/8 |
| 6,163,991 A * | 12/2000 | Drapcho | ............... | G09F 1/06 283/117 |
| 6,193,057 B1 * | 2/2001 | Cappiello, Sr. | .... | B65D 73/0092 206/463 |
| 6,209,924 B1 * | 4/2001 | Pyle | ................... | B42D 15/042 283/117 |
| 6,224,108 B1 * | 5/2001 | Klure | ................... | B42D 15/025 206/38 |
| 6,269,158 B1 | 7/2001 | Kim | | |
| 6,299,530 B1 * | 10/2001 | Hansted | ................... | B42D 5/027 206/449 |
| 6,315,206 B1 * | 11/2001 | Hansen | ................... | A45C 11/182 235/380 |
| 6,349,829 B1 | 2/2002 | Matheis et al. | | |
| 6,375,003 B1 * | 4/2002 | Lethen | ................... | B65D 85/546 206/308.1 |
| 6,438,877 B1 * | 8/2002 | Ruiz | ................... | G09F 1/06 40/124.04 |
| 6,451,399 B1 * | 9/2002 | Boyce | ................... | A47G 1/0633 40/124.01 |
| 6,493,970 B1 | 12/2002 | McCarthy et al. | | |
| 6,619,480 B2 | 9/2003 | Smith | | |
| 6,640,473 B1 * | 11/2003 | Shenk | ................... | G09F 1/04 206/215 |
| 6,715,795 B2 | 4/2004 | Klure | | |
| 6,871,430 B1 * | 3/2005 | Landolt | ................... | B42D 15/047 40/124.09 |
| 6,877,263 B2 | 4/2005 | Clark | | |
| D512,456 S * | 12/2005 | Diaz | ........................... | D19/10 |
| 7,000,844 B1 | 2/2006 | Smith | | |
| 7,040,049 B2 * | 5/2006 | Cox | ................... | B42D 15/045 283/101 |

(56) References Cited

U.S. PATENT DOCUMENTS

| | | | |
|---|---|---|---|
| 7,055,740 B1 * | 6/2006 | Schultz | B42D 15/022 235/381 |
| 7,204,048 B2 * | 4/2007 | Kershner | B42D 15/045 40/124.06 |
| D545,359 S * | 6/2007 | Bramhall | D19/1 |
| 7,275,683 B2 | 10/2007 | Lazarowicz et al. | |
| D600,965 S * | 9/2009 | Elia | D6/626 |
| 7,664,681 B1 * | 2/2010 | Oliveau | G06Q 30/02 705/26.1 |
| D641,579 S * | 7/2011 | Wynalda, Jr. | D6/407 |
| 8,109,388 B2 | 2/2012 | Rosendall et al. | |
| D658,230 S * | 4/2012 | Segal | D19/2 |
| 9,126,727 B2 | 9/2015 | Rosendall et al. | |
| D764,583 S * | 8/2016 | Chambers | D19/6 |
| 2001/0045738 A1 * | 11/2001 | Klure | B42D 15/025 283/61 |
| 2002/0088855 A1 * | 7/2002 | Hodes | B65D 5/422 235/385 |
| 2002/0100797 A1 | 8/2002 | Hollingsworth et al. | |
| 2002/0125153 A1 * | 9/2002 | Cinquina | G11B 33/0422 206/308.1 |
| 2002/0195816 A1 * | 12/2002 | Anise | B42D 1/007 283/56 |
| 2003/0028439 A1 | 2/2003 | Cox et al. | |
| 2003/0030268 A1 * | 2/2003 | Hilicki | B42F 5/00 281/29 |
| 2003/0066777 A1 * | 4/2003 | Malone | A45C 11/182 206/449 |
| 2003/0080013 A1 * | 5/2003 | Smith | B65D 73/0078 206/449 |
| 2003/0111368 A1 * | 6/2003 | Wynalda, Jr. | G11B 33/0422 206/312 |
| 2003/0121807 A1 * | 7/2003 | Oguchi | B65D 85/548 206/312 |
| 2003/0133630 A1 | 7/2003 | Wang | |
| 2003/0150142 A1 * | 8/2003 | Street | B42D 15/045 40/124.11 |
| 2003/0230501 A1 * | 12/2003 | Smolev | B42D 15/045 206/232 |
| 2004/0146688 A1 | 7/2004 | Treat | |
| 2004/0245134 A1 | 12/2004 | Alcouloumre et al. | |
| 2005/0150789 A1 * | 7/2005 | Crane | A47F 7/0042 206/307.1 |
| 2005/0204600 A1 | 9/2005 | Lauer et al. | |
| 2005/0279825 A1 | 12/2005 | Ashby et al. | |
| 2006/0032764 A1 * | 2/2006 | Swenson | B42D 15/045 206/232 |
| 2006/0080871 A1 * | 4/2006 | McGoey | B42D 15/045 40/124.11 |
| 2006/0255154 A1 * | 11/2006 | Newbrough | A45C 11/182 235/486 |
| 2006/0273153 A1 | 12/2006 | Ashby et al. | |
| 2007/0006713 A1 * | 1/2007 | Dunlop | G10D 3/163 84/322 |
| 2007/0063052 A1 * | 3/2007 | Chakiris | B42D 15/045 235/486 |
| 2007/0089332 A1 * | 4/2007 | Lee | B42D 15/045 40/124.06 |
| 2007/0200000 A1 * | 8/2007 | Sanders | B42D 15/042 235/487 |
| 2007/0267862 A1 * | 11/2007 | Barr | B42D 15/08 283/61 |
| 2008/0114696 A1 * | 5/2008 | Singh | G06Q 20/20 705/66 |
| 2008/0116088 A1 * | 5/2008 | Roberts | B42D 15/042 206/232 |
| 2008/0116089 A1 * | 5/2008 | Roberts | B42D 15/042 206/232 |
| 2008/0237317 A1 | 10/2008 | Rosendall | |
| 2009/0107862 A1 | 4/2009 | Pascua et al. | |
| 2009/0199516 A1 * | 8/2009 | Gustavsson | B42D 15/045 53/467 |
| 2010/0095566 A1 * | 4/2010 | Gustafson, Jr. | B42D 15/042 40/124.01 |
| 2010/0170814 A1 * | 7/2010 | Davis | B65D 65/466 206/307 |
| 2010/0213097 A1 * | 8/2010 | Paliotta | B65D 5/4204 206/531 |
| 2010/0223824 A1 * | 9/2010 | Mandelbaum | B42D 15/022 40/463 |
| 2010/0325037 A1 * | 12/2010 | Halbur | B42D 15/045 705/39 |
| 2011/0031148 A1 | 2/2011 | Rosendall | |
| 2011/0088293 A1 * | 4/2011 | Mason | B42D 15/022 40/124.03 |
| 2011/0210036 A1 * | 9/2011 | Jones | B65D 73/0092 206/531 |
| 2011/0247247 A1 * | 10/2011 | Mayer | B42D 15/022 40/124.03 |
| 2012/0085672 A1 * | 4/2012 | Gelardi | B65D 73/0092 206/484 |
| 2012/0145578 A1 * | 6/2012 | Pazlar | B65D 75/5833 206/459.5 |
| 2012/0260542 A1 * | 10/2012 | Kibbe | B42D 15/045 40/124.06 |
| 2012/0285968 A1 * | 11/2012 | Glass | B42F 7/02 220/345.1 |
| 2013/0118931 A1 * | 5/2013 | Rodriguez | B65D 85/30 206/308.1 |
| 2013/0192105 A1 * | 8/2013 | Glass | B42D 15/045 40/124.06 |
| 2013/0248406 A1 | 9/2013 | Glinert | |
| 2014/0209505 A1 * | 7/2014 | Martin | B65B 5/026 206/778 |
| 2014/0299493 A1 * | 10/2014 | Nakagawa | B42D 15/025 206/307 |
| 2015/0072098 A1 * | 3/2015 | Johnson | B42D 25/425 428/43 |
| 2015/0360838 A1 | 12/2015 | Rosendall et al. | |

FOREIGN PATENT DOCUMENTS

| | | | | |
|---|---|---|---|---|
| EP | 1296306 A2 | | 3/2003 | |
| FR | 2852293 A1 | * | 9/2004 | B42D 1/007 |
| GB | 1393199 A | * | 5/1975 | A47G 1/0633 |
| GB | 2444575 A | * | 6/2008 | A47G 1/0633 |
| JP | 10053291 A | * | 2/1998 | |
| JP | 2004065677 A | * | 3/2004 | |
| WO | WO 9941162 A1 | * | 8/1999 | B65D 85/546 |
| WO | 99/44903 A1 | | 9/1999 | |
| WO | 2011016877 A1 | | 2/2011 | |

* cited by examiner

DISPLAY DEVICE

FIELD OF THE INVENTION

The present invention relates generally to a display device, and more specifically to a display configuration which provides a combination of support layers, receiving layers and a sleeve structure that displays an item.

BACKGROUND OF THE INVENTION

In the retail sector and elsewhere, there has been an ongoing and growing need for improved packaging that is both easily customized and recyclable. There is a further need for packaging that provides a display for intangible goods, such as products available for digital download. Further, product packaging for many consumer goods is typically designed to attract visual attention on a retail display or shelf. Such visually attractive packaging is generally utilized for tangible goods, whereas intangible goods are typically located separate from tangible goods where visually attractive packaging is rarely utilized.

Notwithstanding the above, there remains a need for improved packaging for intangible goods that is designed to visually attract attention. There is a further need for packaging for intangible goods that is both customizable and easily recycled. More particularly, there is a need for visually attracting packaging that is shaped to receive an item that provides user instructions for accessing an intangible product.

SUMMARY OF THE INVENTION

The present invention addresses one or more of the above needs by providing improved packaging for intangible goods such that the packaging receives an item for providing instructions for accessing an intangible product. For example, the packaging may comprise a display device including a first receiving layer. A second receiving layer may be located onto and in direct planar contact with the first receiving layer. The display device may further include a first support later. A second support layer may be located onto and in direct planar contact with the first support layer. The display device may include a sleeve for receiving one or more of the first and second receiving layers and first and second support layers. The first and second receiving layers may be located onto and parallel with the first and second support layers.

The display device may be formed so that one or more of the receiving layers includes one or more openings. The first receiving layer may include one or more openings. The second receiving layer may include one or more openings. The one or more receiving layers may each include exactly one opening. The one or more receiving layers may each include exactly two openings. At least one of the one or more receiving layers may each include exactly one opening. At least one of the one or more receiving layers may each include exactly two openings. Each of the first and second receiving layers may include one or more openings and each opening in the first receiving layer may be located adjacent and corresponds to each opening in the second receiving layer.

The display device may also include an adhesive for attaching the one or more receiving layers to one another. An adhesive may be included for attaching the one or more support layers to one another. The first and second receiving layers and first and second support layers may be received within the sleeve. The sleeve may comprise a substantially transparent plastic material. The sleeve may comprise an amorphous polyethylene terephthalate (APET) material. One or more of the first and second receiving layers and one or more of the first and second support layers may comprise a paperboard material. One or more of the first and second receiving layers, the first and second support layers, and the sleeve may comprise a recyclable material.

One or more of the first and second receiving layers may include one or more openings and each opening may receive an item. The shape of each item may substantially correspond to the shape of each opening. The item may be a substantially planar card. Both the first and second receiving layer may contact an item located within an opening formed in both the first and second receiving layer.

Advantageously, the packaging may be formed as a layered structure having one or more receiving layers and one or more support layers. The packaging may further include a covering layer (e.g., a sleeve) for covering one or more assembled receiving and support layers.

The packaging described herein provides for a recyclable display device that comprises a material and shape that may be designed to attract visual consumer attention while housing an item that provides information for accessing an intangible product.

DETAILED DESCRIPTION

Figure 1:
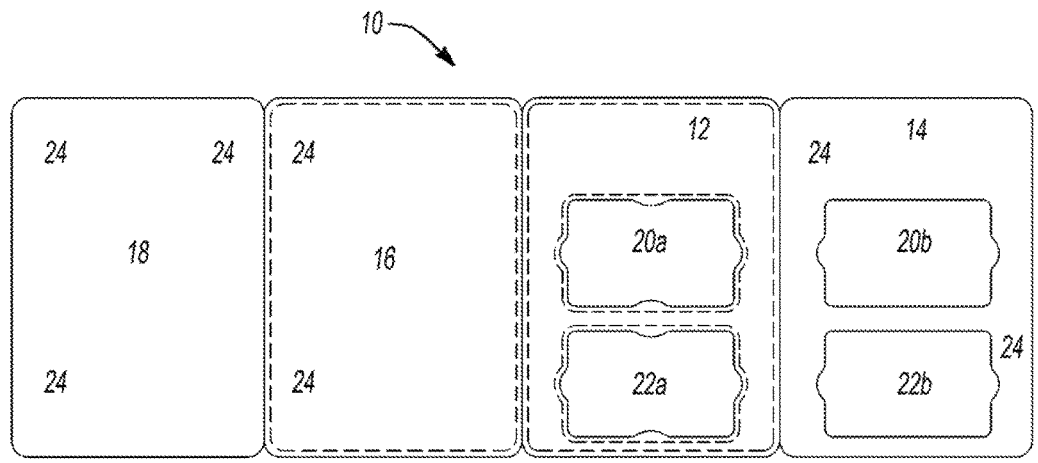
FIG. 1 is a top down schematic view of an illustrative packaging in accordance with the present teachings.

In general, the teachings herein provide for a packaging that includes a plurality of layered materials. The layered materials may comprise a paperboard material, a polymeric material, or a combination thereof. One or more layers may be formed for receiving printing, graphics, coatings or any other visual modification of the layers. Preferably, at least one layer includes an opening, a fastener, an adhesive or some other means for receiving an item. The item may be any item capable of receiving printed graphics (e.g., writing and/or instructions). It is also possible that all layers are free of any item, such that a layer itself receives the necessary written material (e.g., writing and/or instructions).

Each layer may be located in direct planar contact with one or more adjacent layers. An adhesive or other means for connecting the layers may be located between each layer. Alternatively, structures may be included to create space between one or more adjacent layers. Such structures may be located such that they create space between two adjacent layers in their entirety. Alternatively, such structures may create space between two adjacent layers at only portions of the adjacent layers, whereby other portions of the adjacent layers will be free of any structures therebetween.

If an item is included, one or more layers may be formed for including openings for receiving the item. In the event that more than one layer includes such an opening, the opening on each layer may be formed to correspond with openings on adjacent layers. As an example, an opening on a first receiving layer may receive (e.g., be located about) an item, while an opening on a second adjacent receiving layer may be located over and onto the opening in the first receiving layer such that the item may still be viewed through the corresponding opening in the second receiving layer.

One or more support layers may also be included. Such support layers may be located in direct planar contact with one or more of an adjacent support layer and/or an adjacent receiving layer. Each support layer may be substantially free of any openings or other structures for receiving an item. Alternatively, one or more of the support layers may also include one or more openings, which may or may not be located adjacent any opening in the one or more receiving layers.

In one embodiment, a first receiving layer may be located adjacent a second receiving layer. Each receiving layer may be formed with one or more openings for receiving and/or viewing an item. The first receiving layer may be located in direct planar contact with a first support layer. The first support layer may then be located in direct planar contact with a second support layer. The resulting packaging may thus be formed as a four-layer composite structure including. Such for layer structure may be formed as a second receiving layer located onto a first receiving layer, located onto a first support layer, located onto a second support layer.

It is also possible that the display device is formed using a single receiving layer and/or a single support layer. As an example, the device may be formed using only a first receiving layer and a first and second support layer. Alternatively, the device may be formed so that it includes only a single support layer and multiple receiving layers (e.g., a first receiving layer, a second receiving layer, a third receiving layer or more). It is possible that the display be device may be substantially free of any support layer, or substantially free of any receiving layer.

Each layer may cover the entirety of the device or one or more layers may only extend to cover a portion of the device. As an example, one or more support layers may extend to cover only a portion of an adjacent support layer and/or an adjacent receiving layer. One or more receiving layers may also or alternatively cover only a portion of an adjacent receiving layer and/or an adjacent support layer. It is possible that portions of the display device (e.g., portions that are adjacent any opening formed in the one or more receiving layers and/or one or more support layers) may require additional support or strength to support any item located within the opening. Thus, the portions adjacent the openings may include additional layers and/or may comprise thicker materials than portions of the display device that are not adjacent the openings.

The thickness of the various layers may be substantially similar or may vary depending upon the layer. As an example, the one or more receiving layer may have a thickness that is less than the thickness of the one or more support layers. The thickness of any polymeric layer, or any layer having a polymeric coating may be greater than that of any later comprising a paperboard material. The material of one or more layers may be selected so that the thickness of the layer is substantially similar to the thickness of an item (e.g., a card or the like) which is located within an opening in the display device. It is possible that the thickness of more than one layer may be combined to substantially match the thickness of an item that is to be located into the one or more openings in the display device. It is also possible that the thickness of the materials is selected so that upon locating an item within the one or more openings of the display device, one or more surfaces of the item are flush with (e.g., they do not extend beyond the surface of) the top layer of the display device. The surface of the item may also fall below the top layer of the display device. As a result, the display device may surround the item in such a way that avoids damage to the item.

The layered structure may also be formed as a planar die cut structure. Each of the layers may be formed as connected along one or more edges to one or more adjacent layers to form an elongated planar structure. The die cut planar structure may then be folded to form the multi-layered composite as discussed herein. In one embodiment, the second receiving layer may be folded onto the first receiving layer and the second support layer may be folded onto the first support layer. The receiving layers may then be folded onto the support layers. The layers may remain connected along one or more edges to adjacent layers, or may be separated upon assembly. Such separation may be facilitated by perforations located between the layers. For a paperboard sheet form having a thickness of from about 14 point to about 22 point, the scoring depth for at least a portion of the score lines may be greater than about 0.5 point. The scoring depth for at least a portion of the score lines may be less than about 4 point. The scoring depth for at least a portion of the score lines may be about 2 point. Any perforated portion of a score line may have a scoring depth sufficient to rupture the base substrate, any polymeric coating, or both to allow for easy separation of the panels prior to assembly. Any portion of a score line may have a scoring depth of greater than about 0.5 point. Any portion of a score line may have a scoring depth of less than about 8 point. The die cut structure may facilitate simplified flat shipping to a customer, where the display device can be assembled by the customer upon receiving the flat die cut structure.

As discussed herein, one or more of the layers may include a coating. This coating may be a wax material or may be polymeric material, examples of which may include rubber, polyethylene, polyurethane, polyvinyl chloride, silicone, or any combination thereof. The coating may also be biodegradable and may include cellulose, calcium, starch or combinations thereof. This coating may be applied to one or more layers of the display device. The thickness of the coating may be greater than about 0.005 mm. The thickness of the coating may be less than about 0.3 mm. The thickness of the coating may be greater than about 0.0127 mm. The thickness of the coating may be less than about 0.0508 mm. The display device may also include additional coatings to promote the durability of the display device such as a varnish, aqueous, or ultra violet coating. Any layer or coatings may be applied to the one or more layers of the display device by lamination, co-extrusion, or any coating process such as rolling, brushing, dip coating or spray coating.

In addition to the layered structure, the packaging may also include a protective layer, which may be a sleeve. The protective layer may be located in contact with one or more surfaces of the assembled layered structure. The protective layer may be formed as a sleeve such that it substantially surrounds the entire layered structure. The protective layer may be formed of a material that prevents the underlying layered structure from damage (e.g., tearing or the like). The protective layer may be formed of a polymeric material or coating and may preferably be a recyclable polymeric material.

As shown for example in FIG. 1, the packaging 10 may include a first receiving layer 12, a second receiving layer 14, a first support layer 16 and a second support layer 18. A covering layer or sleeve (not shown) may be located about the receiving and support layers upon assembly of the packaging. The first receiving layer is shown to include a first opening 20*a* and a second opening 22*a*. The second receiving layer is shown to include a first opening 20*b* and a second opening 22*b*. An adhesive 24 may be located along certain portions of the receiving layers 12, 14, the support layers 16, 18, or both.

Figure 2:
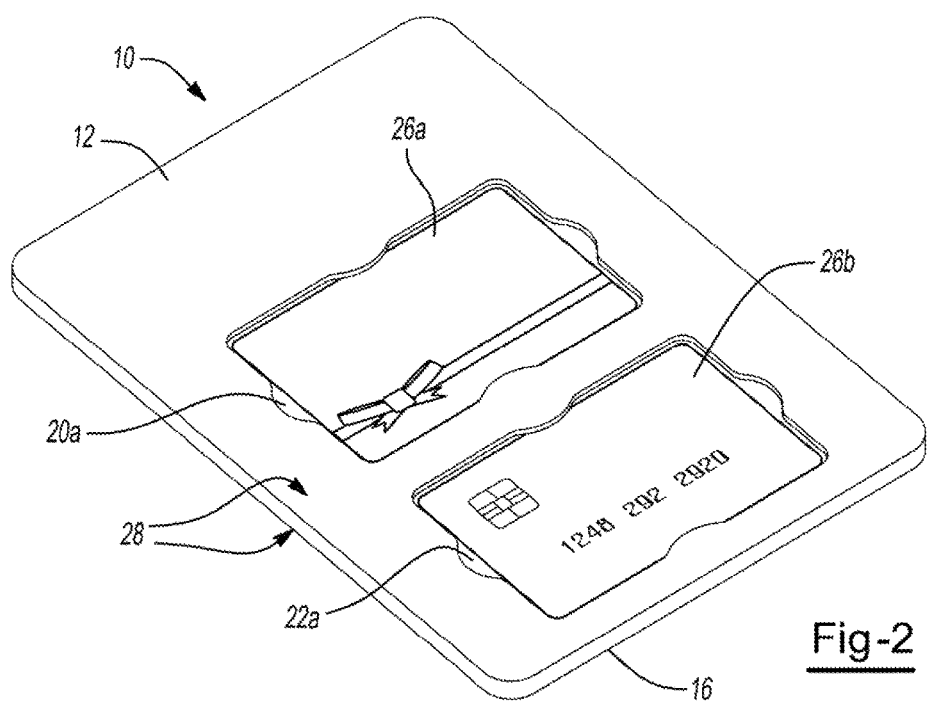
FIG. 2 is a perspective view of an illustrative packaging accordance with the present teachings.

An assembled packaging example is shown at FIG. 2. The first receiving layer 12 is visible and includes a first opening 20*a* and a second opening 22*a*. Each opening receives an item 26*a*, 26*b* within each opening. The first support layer 16 is shown at the back of the resulting packaging. A protective sleeve 28 is located about the packaging.

The layers discussed herein may be formed of any packaging material pliable enough to be scored and folded but strong enough to provide sufficient support for containing an item thereon or within. For example, the assembled layers will be free of any flexing or bending under the weight of any item held within.

A particular feature of the material may be that it is durable enough to resist tearing during attempts to remove any packaging contents from within the layers. The layers may be formed of paper materials including but not limited to paperboard, chipboard, cardboard, fiberboard, natural fibers, mineral fibers or any combination thereof. The layer material may be a virgin material, a post-consumer recycled material, or both. The layer material may be a recyclable material and/or a biodegradable material. If the layer material includes paperboard, the paperboard may be a bleached or unbleached paperboard. For example it may be a solid bleached sulfate (SBS) paperboard. The layer material may contain a major portion that can be recycled. The layers may be formed of a polymeric material including but not limited to thermoplastics, thermoset plastics, elastomeric containing materials or any combination thereof. Examples of polymeric materials that may be employed include polyamide, polyester, polystyrene, polyethylene (including polyethylene terephthalate, high density polyethylene and low density polyethylene), polypropylene, polyvinyl chloride, bio-based plastics/biopolymers (e.g., poly lactic acid), silicone, acrylonitrile butadiene styrene (ABS), or any combination thereof.

The layers may be formed of differing materials. For example, the one or more receiving layers may be formed of a material that differs from the one or more support layers. One receiving layer may be formed of a first material and an adjacent receiving layer may be formed of a second material that differs in some way from the first material. One support layer may be formed of a first material and an adjacent support layer may be formed of a second material that differs in some way from the first material. As an example, the one or more receiving layers may be formed of a paperboard material while the one or more support layers may be formed of a polymeric material. Alternatively, the one or more receiving layers may be formed of a polymeric material, while the one or more support layers may be formed of a paperboard material. As another example, any layer exposed on the exterior of the assembled layers (e.g., the second receiving layer and/or the second support layer) may be formed of a material selected so that at least one surface of the material can receive printing (e.g., graphics). It is possible that one or more of the receiving layers or support layers are comprised of multiple materials, in that one surface of a layer may be formed of a paperboard material while an opposing surface may be formed of a polymeric material, which may also be in the form of a polymeric coating.

The gauge of the layer material may vary depending on the size of the packaging or the desired strength of the packaging. As an example, if the layer material includes paperboard, the gauge of the paperboard may be greater than about 6 point paperboard. The gauge of the paperboard may be less than about 40 point paperboard.

Though not necessarily drawn to scale, geometries, relative proportions and dimensions shown in the drawings are also part of the teachings herein, even if not explicitly recited. However, unless otherwise stated, nothing shall limit the teachings herein to the geometries, relative proportions and dimensions shown in the drawing.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The invention claimed is:

1. A display device comprising:
    a folded, four-layered structure, comprising:
        a first receiving layer comprising a first opening having a first perimeter;
        a second receiving layer that is attached to the first receiving layer at a first edge, the second receiving layer comprising a second opening having a second perimeter;
        a first support layer that is attached to the first receiving layer at a second edge, the first support layer is free of an opening;
        a second support layer that is attached to the first support layer at a third edge, the second support layer is free of an opening; and
    a sleeve for receiving the folded, four-layered structure, the sleeve comprises a substantially transparent plastic material;

wherein the first edge is generally parallel to the second edge, and the second edge is generally parallel to the third edge;

wherein in an unfolded configuration:
i. the first support layer is disposed between the second support layer and the first receiving layer; and
ii. the first receiving layer is disposed between the first support layer and the second receiving layer;

wherein in a folded configuration:
i. the second receiving layer is folded onto and in direct planar contact with the first receiving layer;
ii. the second support layer is folded onto and in direct planar contact with the first support layer; and
iii. the first and second receiving layers are folded directly onto and parallel with the first and second support layers such that the second receiving layer is in direct planar contact with the second support layer, and the first opening is located over and aligned with the second opening;

wherein the first perimeter and second perimeter have substantially the same size and shape except for at least one retaining element on the first perimeter, the at least one retaining element extends inwardly from an edge of the first perimeter such that when the first opening and the second opening receive an item therein, the respective first perimeter and the second perimeter is located around the item and in contact with the item, and the item is contacted by the at least one retaining element but remains viewable through the first opening and the second opening.

2. The display device of claim 1, further comprising an additional first opening and an additional second opening for an additional item.

3. The display device of claim 1, wherein the direct planar contact between the first receiving layer and second receiving layer comprises an adhesive therebetween.

4. The display device of claim 1, wherein the direct planar contact between the first support layer and second support layer comprises an adhesive therebetween.

5. The display device of claim 1, wherein the sleeve comprises an amorphous polyethylene terephthalate (APET) material.

6. The display device of, claim 1, wherein one or both of the first and second receiving layers and one or both of the first and second support layers comprise a paperboard material.

7. The display device of claim 1, wherein the at least one retaining element is two retaining elements on opposing edges of the first perimeter.

8. The display device of claim 1, wherein in the folded configuration, the first receiving layer is located on a front side of the display device and the first support layer is located on a back side of the display device.

9. The display device of claim 1, wherein a shape of the item substantially corresponds to the first perimeter and the second perimeter.

10. The display device of claim 9, wherein the item is a substantially planar card.

11. A display device comprising:
a folded, four-layered structure, comprising:
a first receiving layer comprising a first opening having a first perimeter;
a second receiving layer that is attached to the first receiving layer at a first edge, the second receiving layer comprising a second opening having a second perimeter;
a first support layer that is attached to the first receiving layer at a second edge, the first support layer is free of an opening;
a second support layer that is attached to the first support layer at a third edge, the second support layer is free of an opening; and
a sleeve for receiving the folded, four-layered structure, the sleeve comprises a substantially transparent plastic material;

wherein in an unfolded configuration:
i. the first support layer is disposed between the second support layer and the first receiving layer; and
ii. the first receiving layer is disposed between the first supporting layer and the second receiving layer;

wherein in a folded configuration:
i. the second receiving layer is folded onto and in direct planar contact with the first receiving layer;
ii. the second support layer is folded onto and in direct planar contact with the first support layer; and
iii. the first and second receiving layers are folded directly onto and parallel with the first and second support layers such that the second receiving layer is in direct planar contact with the second support layer, and the first opening is located over and aligned with the second opening;

wherein the first perimeter and second perimeter have substantially the same size and shape except for at least two retaining elements on the first perimeter, each of the at least two retaining elements extending inwardly from opposing edges of the first perimeter such that when the first opening and the second opening receive an item therein, the first perimeter and the second perimeter are located therearound and in contact with the item, and the item is retained by the at least two retaining elements but remains viewable through the other of the first opening or the second opening.

* * * * *